March 10, 1970           L. MÜLLER           3,499,337
VIBRATOR DEVICE
Filed July 22, 1968           3 Sheets-Sheet 1
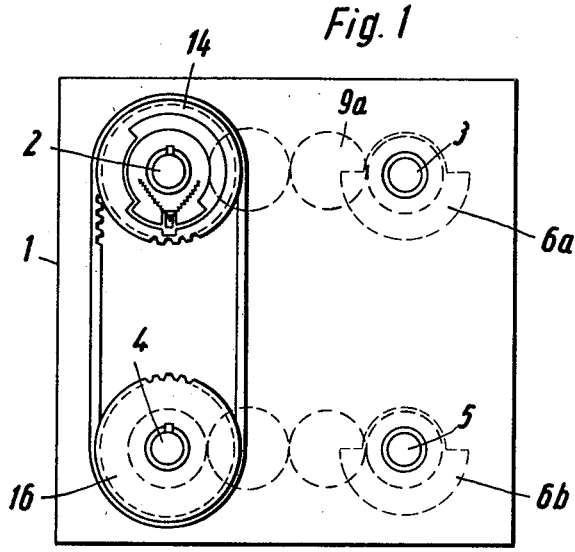
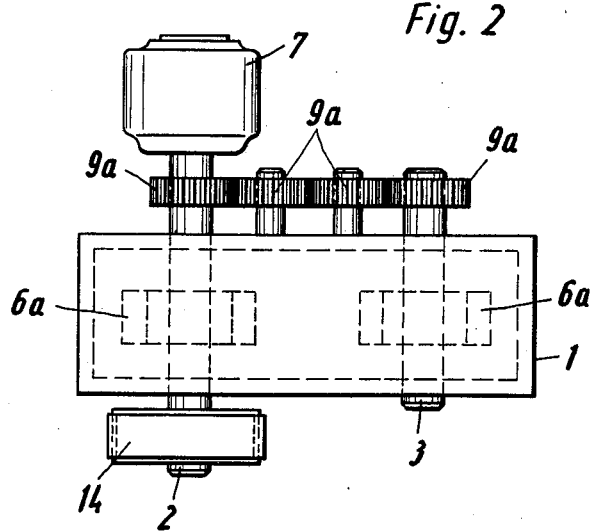
Inventor:
Ludwig Müller
BY Hame and Baphing
ATTORNEYS

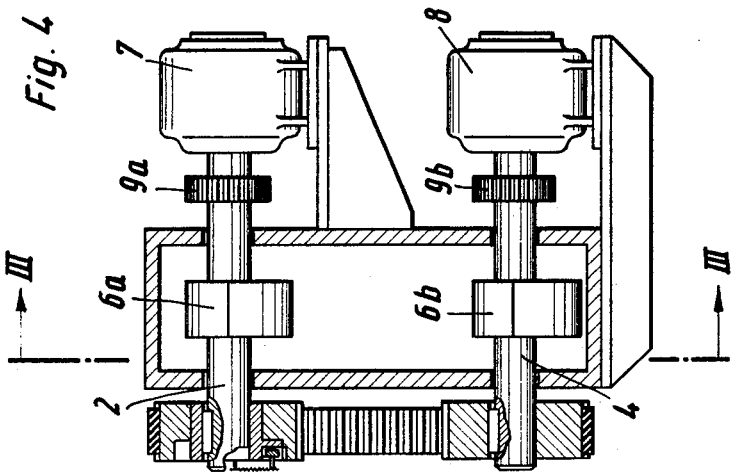
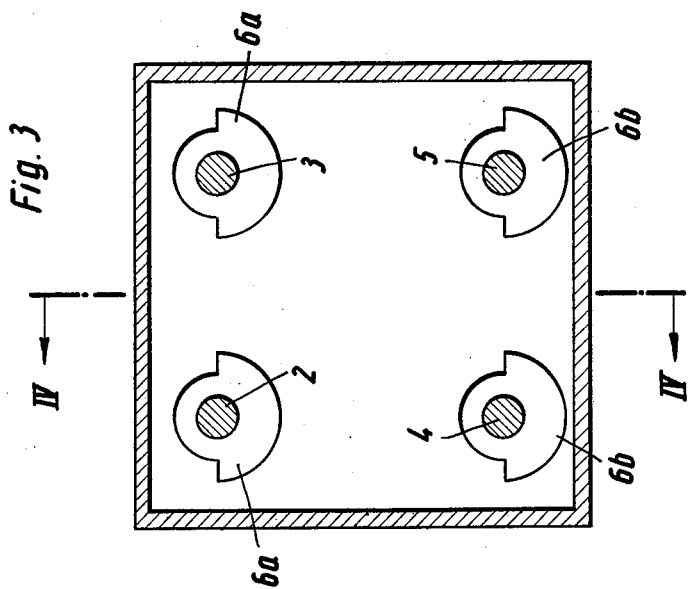

March 10, 1970 L. MÜLLER 3,499,337
VIBRATOR DEVICE

Filed July 22, 1968 3 Sheets-Sheet 3

Inventor:
LUDWIG MÜLLER
BY Hane and Bayley
ATTORNEYS

United States Patent Office 3,499,337
Patented Mar. 10, 1970

3,499,337
VIBRATOR DEVICE
Ludwig Müller, 44–66 Heinrich-Heine-strasse,
355 Marburg, Germany
Filed July 22, 1968, Ser. No. 746,440
Claims priority, application Germany, July 22, 1967,
M 74,874
Int. Cl. F16h 33/08
U.S. Cl. 74—61                                    8 Claims

ABSTRACT OF THE DISCLOSURE

A vibrator device as used for instance for driving construction piles into the ground, is started by initially rotating two or more unbalance shafts in mutually angularly displaced positions in which the unbalances of the shafts are out of phase so that the device does not generate vibrations of appreciable force and then turning the unbalance shafts in reference to each other into mutually angular positions in which the unbalances of the shafts are in phase so that vibrations are now generated thereby avoiding the occurrence of heavy current surges during the starting period of the device.

Figure 5:
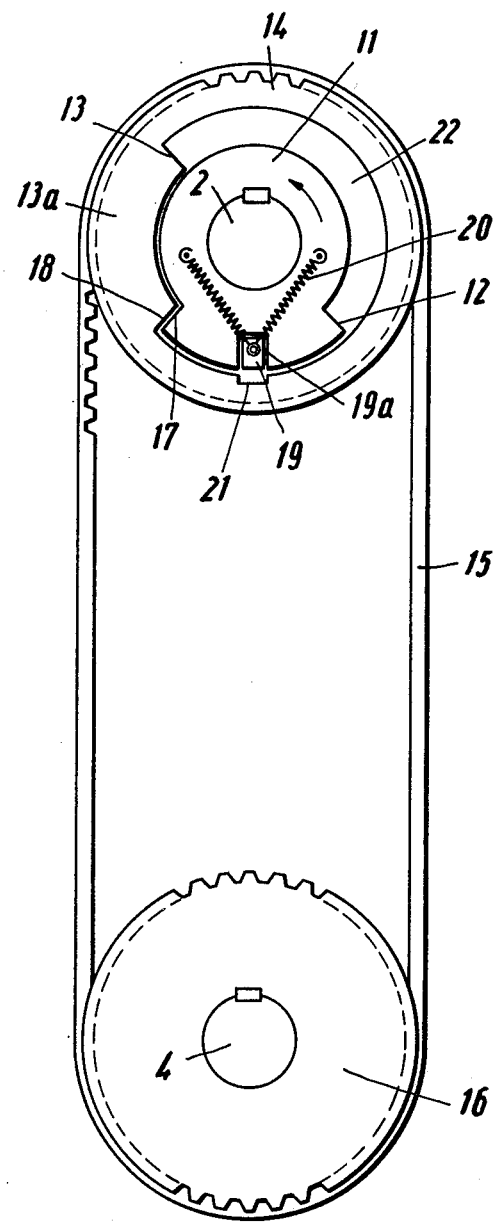

The invention relates to a vibrator device which has several generally at least four shafts with unbalance weights fixedly secured thereon, the shafts being disposed in superimposed pairs, the shafts of each pair being driven at a synchronous speed. More particularly, the invention relates to a tsarting device for a vibrator of the general kind above referred to.

The starting of a vibrator of the general kind above referred to presents difficulties in that the starting period requires a heavy current input. Accordingly, special electrical control means must generally be provided to avoid powerful current surges during the starting period. As the vibrators are used on the construction sites, providing, servicing and operating such control means for limiting initial current surges entail a considerable increase in equipment and overall operating costs.

It is a broad object of the invention to provide a novel and improved vibrator device of the general kind above referred to which can be started without the occurence of initial heavy current surges.

A more specific object of the invention is to provide a novel and improved vibrator device of the general kind above referred to which does not generate vibrations of appreciable force during the starting period thereby reducing the initial current surge to values which can be easily sustained without requiring special and costly control equipment.

The afore pointed out objects, features and advantages of the invention and other objects, features and advantages which will be pointed out hereinafter are obtained by initially driving one of the pairs of shafts of the device by a first motor and coupling the driven shafts with the shafts of the other pair via transmission means in an out-of-phase position in which vibrations generated by the unbalance weights on the shafts substantially neutralize each other so that the total vibration output of the device is very low or practically zero thereby correspondingly reducing the power take-up during the initial or starting period. After the starting period, the shafts of the second pair are driven by a second motor while the first motor is disconnected. The out-of-phase position of the shafts is generally an angular mutual displacement of 180° thereof. When the device has reached the rotational speed for which it is set, the second motor is started after stoppage of the first motor thereby causing transmission means to turn the shafts of both pairs into a mutual angular position in which the unbalance weights on all the shafts are in phase whereupon the device generates equally directed vibrations. The first motor can now be restarted so that the shafts of the device are now driven by both motors.

Broadly, the transmission means comprise a first coupling member fixedly secured on one of the shafts driven by the first motor and coacting with a second coupling member which, in turn, is drivingly connected with the shafts to be driven by the second motor.

According to a preferred embodiment of the invention, the first coupling member is disposed coaxially with the second coupling member. This second coupling member is in the form of an annular pulley coupled by suitable coupling means such as a gear belt with a pulley on one of the shafts also coupled to the second motor. The annular pulley has on its inner wall shoulders engaged with abutment portions on the first coupling member when the two coupling members are in predetermined angular positions in reference to each other as will be more fully explained hereinafter.

The annular pulley or second coupling member may be releasably locked to the first coupling member. Locking means suitable for the purpose may comprise a bolt slidably supported, preferably in radial direction, on the first coupling member and engageable with a recess in the inner wall of the second coupling member. The bolt is biased out of such engagement by a suitable bias means and is moved into engagement by centrifugal force when both coupling members are rotated, or by a positive control force provided by a pneumatic, hydraulic or electric control means.

In the accompanying drawing a preferred embodiment of the invention is shown by way of illustration and not by way of limitation.

In the drawing:
FIG. 1 is a diagrammatic elevational view of a vibrator device according to the invention,
FIG. 2 is a plan view of FIG. 1,
FIG. 3 is a section taken on line A—A of FIG. 4,
FIG. 4 is an elevational sectional side view of the vibrator device taken on line B—B of FIG. 3; and
FIG. 5 is a diagrammatic detailed view of the transmission means on an enlarged scale.

Referring now to the figures more in detail, the exemplified vibrator device comprises a housing 1 in which an upper pair of shafts 2 and 3 and a lower pair of shafts 4 and 5 are rotatably mounted. Shafts 2 and 3 have secured thereupon unbalance weights 6a and shafts 4 and 5 unbalance weights 6b.

A first motor 7 is coupled to shaft 2 which, in turn, is coupled by gears 9a to shaft 3 so that both upper shafts 2 and 3 can be driven by the motor at a synchronous speed. Similarly, a second motor 8 is coupled to shaft 4 so that shafts 4 and 5 can be driven at a synchronous speed via gears 9b.

An annular pulley 14 such as a gear pulley is mounted rotatable about the free end of shaft 2 and coupled by a belt such as a gear belt 15 to a pulley 16 keyed to lower shaft 4 which, as stated before, is coupled by gears 9b to shaft 5. As is now evident, rotation of shaft 2 will cause rotation of all four shafts.

In this connection, it should be mentioned that more than two upper shafts and two lower shafts may be provided, and that in some instances only one upper shaft and one lower shaft may be used. Moreover, the terms "upper" and "lower" are used only to simplify the description but the whole device may, of course, also be disposed in many other angular positions.

Turning now to FIG. 5 which shows in detail the transmission means which effect the reduction or practical elimination of the high current surges, occurring when conventional vibrator devices are started, the transmission means as shown in the figure comprise a first coupling member 11 suitably keyed upon shaft 2. This coupling member is formed with a radially protruding and circumferentially elongate dog or lug 12 defining radial abutment surfaces 17 and 17a.

Annular pulley 14 constitutes a second coupling member and has for this purpose in its inner wall a circumferentially elongate recess 22 forming a radial inwardly protruding portion 13a defining radial shoulders 13 and 18.

As is evident, coupling members 11 and 14 are rotatable with reference to each other within the limits defined by engagement of abutment surface 17a with shoulder 13 and engagement of abutment surface 17 with shoulder 18 for a purpose which will become more fully apparent from the subsequent description.

Coupling member 11 can be releasably locked to coupling member 14 in a predetermined angular position of the two coupling members with reference to each other, and more specifically in the position shown in FIG. 5. Many locking means suitable for the purpose may be readily visualized. There is shown a bolt 19 radially slidable in a slot 19a formed in lug 12 of coupling member 11 and engageable with a recess 21 formed in coupling member 14 when the bolt is in register with recess 21 as shown. A bias means such as a tension spring 20 tends to pull bolt 19 out of engagement with recess 21. Engagement against the action of the spring is effected by centrifugal force when the coupling members are jointly rotated as will become apparent from the subsequent description, or positive setting means such as conventional pneumatic, hydraulic or electrically operated setting means may be used.

The operation of the vibrator device as hereinbefore described is as follows:

Let it be assumed that the vibrator is in the rest position of FIG. 5 and that it is desired to start the vibrator. To this end, motor 7 is connected to power. As a result, shafts 2 and 3 immediately start to rotate and the coupling member 11 is also immediately rotated. However, the rotation of the coupling member is not transmitted immediately to pulley 14 but only after the coupling member has turned through an angle corresponding to the length of recess 22, that is, through an angle of 180° whereupon abutment surface 17a engages shoulder 13, or in other words, when unbalance weights 6a on shafts 2 and 3 are diametrically opposed to unbalance weights 6b on shafts 4 and 5.

Shafts 4 and 5 now start rotation via belt 15 and pulley 16 with unbalance weights 6b on the shafts out of phase with the unbalance weights on shafts 2 and 3. Accordingly, the vibrator does not produce vibrations as is desired during the starting period.

When the vibrator has reached its full rotational speed and accordingly, the initial current surge has subsided to the normal current consumption, motor 7 is stopped and motor 8 is started thereby directly driving shafts 4 and 5. This drive is transmitted to pulley 14 via belt 15. However, pulley 14 will not rotate coupling member 11 until its shoulder 18 engages abutment surface 17 (see FIG. 5) whereupon shafts 2 and 3 are driven via coupling member 11. As is evident, all four shafts are now rotated by motor 8 and the unbalance weights on the shafts are in phase and hence directed vibrations are produced by the vibrator. Moreover, bolt 19 is forced into engagement with recess 21 by centrifugal force against the action of spring 20 thereby locking the two coupling members to each other in the position shown in FIG. 5. The lock is automatically released when the vibrator is stopped.

The vibrator is now in its normal operating condition. Accordingly, motor 7 can be restarted so that the vibrator is driven by both motors.

What is claimed is:

1. A vibrator device comprising in combination:
   a first pair of parallel rotary unbalance shafts;
   a first transmission means drivingly coupling said shafts;
   a second pair of rotary unbalance shafts parallel to each other and the shafts in the first pair;
   a second transmission means drivingly coupling the shafts of the second pair;
   a first drive means and a second drive means for driving the first pair of shafts and the second pair of shafts respectively; and
   a third transmission means drivingly coupling one of the shafts of the first pair with one of the shafts of the second pair, said third transmission means including relatively rotatable first and second coupling members which upon driving of the shafts of the first pair by the first drive means engage each other for transmission of rotation to the shafts of the second pair means when the unbalances on the shafts of the two pairs occupy substantially diametrically opposed positions and which upon driving of the shafts of the second pair by the second drive means engage each other for transmission of rotation to the shafts of the first pair when the unbalances from the shafts of the second pair are in phase.

2. The vibrator device according to claim 1 further comprising releasable locking means for locking said coupling members to each other in a predetermined angular position with reference to each other, and bias means urge said locking means into a release position.

3. The vibrator device according to claim 1 wherein the first one of said coupling members is drivingly coupled with one of the shafts of the first pair and the other coupling member with one of the shafts of the second pair, each of said coupling members having two abutment portions, one of the abutment portions of one of the coupling members engaging one of the abutment portions of the other coupling member for transmission of rotation when the coupling members are in one predetermined position and the other abutment portion of said one coupling member engaging the other abutment portion of the other coupling member for transmission of rotation when the coupling members are in a second predetermined angular position.

4. The vibrator device according to claim 3 wherein the second coupling member is drivingly coupled to said one shaft of the second pair and is an annular member and the first coupling member is drivingly coupled to said one shaft of the first pair and is disposed within said annular member coaxially therewith, the abutment portions of the second coupling member protruding circumferentially spaced and inwardly from the inner wall thereof and the abutment portions of the first coupling member protruding circumferentially spaced and outwardly between the abutment portions of the second coupling member thereby permitting a limited rotation of the first coupling member within and with reference to the second coupling member.

5. The vibrator device according to claim 1 wherein the second coupling member comprises an outer annular driving member coaxially rotatable about said one shaft of the first pair, a pulley fixedly seated on said one shaft of the second pair, and belt means drivingly coupling said driving member and said pulley, said outer driving member having on its inner peripheral wall inwardly protruding circumferentially spaced shoulders, and wherein the first coupling member comprises an inner driving member fixedly seated on said one shaft of the first pair coaxially with the outer driving member, said inner driving member having on its periphery two circumferentially protruding portions, one of said protrusions being engaged with one of said shoulders in one predetermined angular position of the inner driving member and the other protrusion being engaged with the other shoulder in another predetermined angular position of the inner driving member with reference to the outer driving member.

6. The vibrator device according to claim 5 wherein said outer driving member has in its inner peripheral wall a circumferentially elongate recess, the end walls of said recess defining said shoulders, and wherein said inner driving member has on its outer peripheral wall a circumferentially elongate lug, the end walls of said lug defining said protrusions, said lug extending into said recess, the circumferential lengths of the recess and the lug being so correlated that the two driving members are rotatable through an angle of about 180° in reference to each other.

7. The vibrator device according to claim 6 wherein one of the facing peripheral walls of said driving members has a radial recess and the other mounts a radially slidable bolt engageable with said recess when the recess and the bolt are in radial registry, and biasing means bias said bolt out of engagement with said recess against the action of a force urging the bolt toward engagement.

8. The vibrator device according to claim 7 wherein said bolt is mounted in the peripheral wall of the inner driving member radially outwardly slidable with reference thereto and said recess is in the inner peripheral wall of the outer driving member whereby said bolt is urged toward engagement with said recess by centrifugal force when said driving members are jointly rotated.

References Cited

UNITED STATES PATENTS

| 2,852,946 | 9/1958 | Petrin | 74—61 |
| 3,097,537 | 7/1963 | Peterson | 74—61 |
| 3,396,805 | 8/1968 | Müller | 74—61 |

FOREIGN PATENTS

| 932,782 | 7/1963 | Great Britain. |

FRED C. MATTERN, Jr., Primary Examiner

WESLEY S. RATLIFF, Jr., Assistant Examiner